United States Patent
Kanegae et al.

(10) Patent No.: US 10,821,932 B2
(45) Date of Patent: Nov. 3, 2020

(54) PASSENGER PROTECTION APPARATUS

(71) Applicant: SUBARU CORPORATION, Tokyo (JP)

(72) Inventors: Shota Kanegae, Tokyo (JP); Kazuya Yamane, Tokyo (JP); Toru Yamashita, Tokyo (JP); Kenshi Eda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 50 days.

(21) Appl. No.: 16/202,848

(22) Filed: Nov. 28, 2018

(65) Prior Publication Data
US 2019/0299911 A1    Oct. 3, 2019

(30) Foreign Application Priority Data
Mar. 28, 2018 (JP) ................. 2018-061875

(51) Int. Cl.
*B60R 21/16* (2006.01)
*B60R 21/233* (2006.01)
(Continued)

(52) U.S. Cl.
CPC .......... *B60R 21/233* (2013.01); *B60R 21/203* (2013.01); *B60R 21/2338* (2013.01); *B60R 2021/0004* (2013.01); *B60R 2021/0048* (2013.01); *B60R 2021/23107* (2013.01); *B60R 2021/23308* (2013.01); *B60R 2021/23386* (2013.01)

(58) Field of Classification Search
CPC . B60R 21/233; B60R 21/2338; B60R 21/239; B60R 21/205; B60R 2021/23384; B60R 2021/23161; B60R 2021/23308; B60R 2021/2395

USPC ........................................... 280/743.1, 743.2
See application file for complete search history.

(56) References Cited

U.S. PATENT DOCUMENTS 9,650,011 B1 * 5/2017 Belwafa ................ B60R 21/233
9,676,355 B2 * 6/2017 Kruse .................. B60R 21/0132
(Continued)

FOREIGN PATENT DOCUMENTS

JP    2013-01417       1/2013
JP    2015-157603 A    9/2015
(Continued)

OTHER PUBLICATIONS

Japanese Office Action dated Sep. 3, 2019 for Japanese Patent Application No. 2018-061875 (8 pages In Japanese with English Translation).

*Primary Examiner* — Toan C To
(74) *Attorney, Agent, or Firm* — Smith, Gambrell & Russell, LLP

(57) ABSTRACT

A passenger protection apparatus includes an airbag and an inflator. The airbag is configured to hold a passenger sitting on a seat of a vehicle when the airbag deploys, and the inflator is configured to supply gas to expand the airbag. The airbag includes: a main bag configured to hold a head and an upper body of the passenger; sub bags configured to protrude to the passenger to deploy between the main bag and the passenger; and connectors configured to swingably couple the sub bags to the main bag at positions out of a center of the seat in a vehicle width direction, so that the sub bags can swing when a force is applied to the sub bags in the vehicle width direction.

20 Claims, 4 Drawing Sheets

(51) Int. Cl.
*B60R 21/203* (2006.01)
*B60R 21/2338* (2011.01)
B60R 21/00 (2006.01)
B60R 21/231 (2011.01)

(56) References Cited

U.S. PATENT DOCUMENTS

| | | | |
|---|---|---|---|
| 9,738,243 B2* | 8/2017 | Fukawatase | B60R 21/2338 |
| 9,845,067 B2* | 12/2017 | Morris | B60R 21/233 |
| 10,065,594 B2* | 9/2018 | Fukawatase | B60R 21/2338 |
| 10,155,496 B2* | 12/2018 | Faruque | B60R 21/239 |
| 10,391,964 B2* | 8/2019 | Nagasawa | B60R 21/0132 |
| 2011/0309605 A1* | 12/2011 | Kumagai | B60R 21/2338 |
| | | | 280/741 |
| 2013/0001934 A1 | 1/2013 | Nagasawa et al. | |
| 2017/0120854 A1* | 5/2017 | Fukawatase | B60R 21/2035 |
| 2018/0001863 A1 | 1/2018 | Nakanishi et al. | |
| 2018/0111583 A1* | 4/2018 | Jaradi | B60R 21/233 |
| 2018/0251093 A1* | 9/2018 | Rose | B60R 21/01552 |
| 2019/0241147 A1* | 8/2019 | Kanegae | B60R 21/2334 |

FOREIGN PATENT DOCUMENTS

| | | |
|---|---|---|
| JP | 2016-037132 A | 3/2016 |
| JP | 2016-037137 A | 3/2016 |
| JP | 2017-178222 A | 10/2017 |
| JP | 2018-001939 A | 1/2018 |

\* cited by examiner

PASSENGER PROTECTION APPARATUS

The present application claims priority from Japanese Patent Applications No. 2018-061875 filed on Mar. 28, 2018, and the entire contents of which are hereby incorporated by reference.

BACKGROUND

1. Technical Field

The present invention relates to a passenger protection apparatus.

2. Related Art

In order to protect a passenger from a collision and so forth, a seatbelt apparatus and an airbag apparatus have been used in a vehicle such as an automobile. As this sort of airbag apparatus, a passenger protection apparatus configured to equalize impact values in various types of collisions has been proposed in, for example, Japanese Unexamined Patent Application Publication No. 2013-014176. In this passenger protection apparatus, an airbag device includes a pouch-shaped airbag body capable of deploying toward the passenger in a collision of a vehicle. This airbag body includes first and second extending portions which are disposed at an edge on each side of the airbag body in the vehicle width direction and can extend and deploy toward the rear side of the vehicle. In this way, the first and second extending portions are provided to equalize impact values in various types of collisions.

SUMMARY OF THE INVENTION

An aspect of the present invention provides a passenger protection apparatus including: an airbag configured to hold a passenger sitting on a seat of a vehicle when the airbag deploys; and an inflator configured to supply gas to expand the airbag. The airbag includes a main bag configured to hold a head and an upper body of the passenger; sub bags configured to protrude to the passenger to deploy between the main bag and the passenger; and connectors configured to swingably couple the sub bags to the main bag at positions out of a center of the seat in a vehicle width direction, so that the sub bags can swing when a force is applied to the sub bags in the vehicle width direction.

DETAILED DESCRIPTION

Figure 1A:
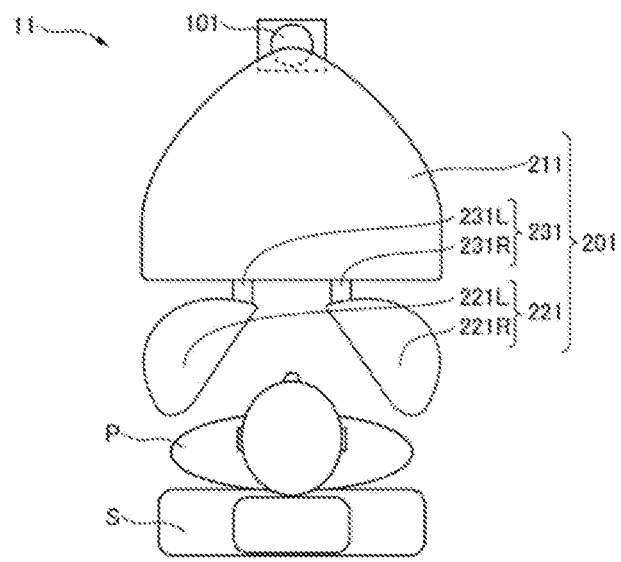
FIGS. 1A-1B are plan views schematically illustrating a passenger protection apparatus according to an example of the present invention.

Hereinafter, an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

When an airbag device with a convex portion to equalize impact values in various types of collisions deploys, the protruding convex portion hits against a passenger depending on the type of collision and the motion of the passenger due to the collision, so that the passenger may be subject to a high impact.

Figure 1B:
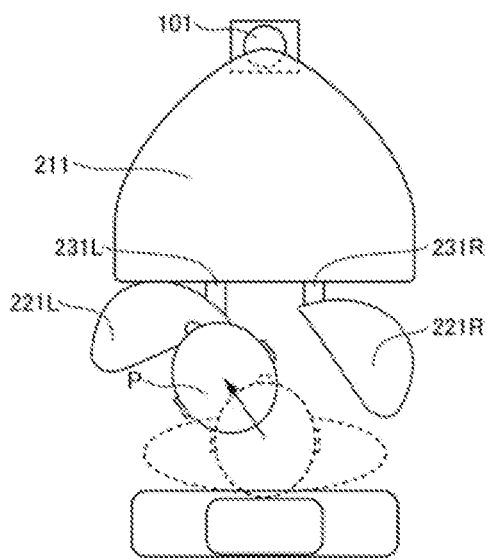

It is desirable to provide a passenger protection apparatus capable of improving the passenger protection function in various types of collisions while reducing an impact on a passenger during the deployment of the airbag. FIGS. 1A and 1B are plan views schematically illustrating a passenger protection apparatus according to an example of the present invention. With the present example, note that the vehicle equipped with the passenger protection apparatus is a vehicle with the steering wheel on the right side, and the passenger protection apparatus provided for the driver's seat will be described.

<Configuration of Passenger Protection Apparatus 11>

As illustrated in FIGS. 1A and 1B, a passenger protection apparatus 11 includes an inflator 101 and an airbag 201.

<Inflator 101>

The inflator 101 ignites explosives upon receiving a signal from an abnormality detector detecting an abnormality of the vehicle such as a collision, or collision prediction, and generates gas by the chemical reaction due to combustion, and then injects the gas into the airbag 201. That is, the inflator 101 is configured to supply the airbag 201 with gas.

<Airbag 201>

The airbag 201 has a pouch-shaped body into which the gas is injected by the inflator 101. When the airbag 201 is not actuated, it is compactly folded. The airbag 201 is provided to be able to deploy around a passenger P sitting on a seat S. When the airbag 201 is supplied with the gas by the inflator 101, the airbag 201 expands to deploy backward from the front of the vehicle, that is, toward the passenger P. The expanding and deploying airbag 201 can hold the passenger P.

Moreover, the airbag 201 includes a main bag 211, sub bags 221, and connectors 231.

<Main Bag 211>

The main bag 211 has a pouch-shaped body and is configured to support the head and the upper body of the passenger P in occurrence of an abnormality such as a collision. In addition, the main bag 211 can deploy backward, that is, toward the passenger P, from a center pad of a steering or an instrument panel. Here, when the main bag 211 is stored in the center pad of the steering, it is preferred that the center pad has a non-rotating structure so as not to move with a ring rim constituting the contour of the steering.

<Sub Bag 221>

The sub bags 221 are coupled to the main bag 211 via the connectors 231, and configured to protrude to the passenger P to deploy between the passenger P and the main bag 211.

The sub bags 211 include a first sub bag 221L and a second sub bag 221R. With respect to the center of the passenger P, the first sub bag 221L deploys near the center of the vehicle, and the second sub bag 221R deploys to face the outside of the vehicle, that is, deploys on the door side of the vehicle.

The surface of each of the first sub bag 221L and the second sub bag 221R, which faces (approaches or contacts) the passenger P is flat or concave, and the opposite surface is rounded, for example, approximately semilunar or crescent. Moreover, when the first sub bag 221L and the second sub bag 221R deploy, the front ends of them facing the passenger P extend to approximately each end of the seat S in the vehicle width direction. That is, the first sub bag 221L and the second sub bag 221R spread to cover a possible maximum range of the lateral movement of the passenger P under a normal condition.

With the present example, the two sub bags 221, the first sub bag 221L and the second sub bag 221R are provided. However, this is by no means limiting, and the number of the sub bags 221 may be one. Alternatively, three or more sub bags 221 may be applicable. Moreover, with the present example, the sub bags 221 are provided on the sides of the passenger P. However, the positions of the sub bags 221 are not limited. For example, with respect to the center of the passenger P, two sub bags 221 may be provided near the center of the vehicle, and one sub bag 221 may be provided on the door side of the vehicle.

<Connector 231>

The connectors 231 are configured to couple the sub bags 221 to the main bag 211. When a force is applied to the sub bags 221 in the vehicle width direction, the sub bags 221 can swing while being coupled to the main bag 211 via the connectors 231. That is, although the connectors 231 couple the main bag 211 to the sub bags 221, the shape of the connectors 231 is not fixed. To be more specific, when a force is applied to the sub bags 221, the connectors 231 can be freely deformed while maintaining the coupling of the main bag 211 and the sub bags 221, and consequently increase the freedom of the motion of the sub bags 221. In addition, a flow path that allows the gas in the main bag 211 to flow into the sub bag 221 is formed in each of the connectors 231.

The connectors 231 include a first connector 231L and a second connector 231R. The first connector 231L is configured to swingably couple the first sub bag 221L to the main bag 211. The second connector 231R is configured to swingably couple the second sub bag 221R to the main bag 211. In this way, the first connector 231L couples the first sub bag 221L to increase the freedom of the motion of the first sub bag 221L. Therefore, when a force is applied from the first sub bag 221L to the main bag 211, the first sub bag 221L closely contacts the main bag 211, so that both the first sub bag 221L and the main bag 211 absorb the impact. Consequently, it is possible to improve the function to protect the passenger P. Likewise, the second connector 231R couples the second sub bag 221R to increase the freedom of the motion of the second sub bag 221R. Therefore, when a force is applied from the second sub bag 221R to the main bag 211, the second sub bag 221R closely contacts the main bag 211, so that both the second sub bag 221R and the main bag 211 absorb the impact. Consequently, it is possible to improve the function to protect the passenger P.

The main bag 211 has vent holes formed at the positions to which the first connector 231L and the second connector 231R are coupled. The first sub bag 221L and the second sub bag 221R have inlets to supply the gas to the sub bags 221 at the positions to which the first connector 231L and the second connector 231R are coupled, respectively. The first connector 231L couples the vent hole of the main bag 211 to the inlet of the first sub bag 221L to allow the gas injected into the main bag 211 to be outputted to the first sub bag 221L. Likewise, the second connector 231R couples the vent hole of the main bag 211 to the inlet of the second sub bag 221R to allow the gas injected into the main bag 211 to be outputted to the second sub bag 221R.

<Operation of Passenger Protection Apparatus 101>

In the passenger protection apparatus 11 having the above-described configuration, when an abnormality detector detects or predicts an abnormality such as a collision, the inflator 101 is actuated to inject the gas into the airbag 201. First, the inflator 101 injects the gas into the main bag 211 of the airbag 201. The main bag 211 expands to deploy backward from the front of the vehicle, that is, toward the passenger P. Then, when the main bag 211 is filled with the gas, the gas flows from the vent holes formed in the main bag 211 into the first sub bag 221L and the second sub bag 221R via the first connector 231L and the second connector 231R.

When the gas flows from the main bag 211 into the first sub bag 221L, the first sub bag 221L expands to deploy on the left side of the passenger P toward the center of the vehicle in an approximate half-moon shape with a flat surface facing the passenger P. Meanwhile, when the gas flows from the main bag 211 into the second sub bag 221R, the second sub bag 221R expands to deploy on the right side of the passenger P toward the door of the vehicle in an approximate half-moon shape with a flat surface facing the passenger P, which is symmetric with the first sub bag 221L. By this means, the main bag 211 spreads in front of the passenger P, the first sub bag 221L spreads on the left side of the passenger P, and the second sub bag 221R spreads on the right side of the passenger P. That is, the airbag 201 spreads to enclose the passenger P.

Here, in the case of a head-on collision of the vehicle, the passenger P moves straight to the front of the vehicle, and the main bag 211 spreading in front of the passenger P absorbs the impact of the collision. However, this head-on collision is rare, and oblique collisions often occur. For example, when the vehicle collides with an object at the front left, the passenger P moves to the upper left as illustrated in FIG. 1B.

In this case, the passenger P contacts the first sub bag 221L to apply a force to the first sub bag 221L diagonally forward left. The first sub bag 221L is swingably coupled to the main bag 211 via the first connector 231L, and therefore moves diagonally forward left to absorb the impact on the passenger P. When the first sub bag 221L is pushed by the passenger P diagonally forward left, the first sub bag 221L contacts the main bag 211. Then, the first sub bag 221L closely contacts the main bag 211 while the main bag 211 absorbs the impact. By this means, it is possible to effectively absorb the impact by both the first sub bag 221L and the main bag 211, and therefore improve the safety of the passenger P.

As described above, the first sub bag 221L is swingably coupled to the main bag 211 via the first connector 231L, and therefore can move to absorb the impact, and more effectively absorb the impact than when the first sub bag 221L is fixedly coupled to the main bag 211. Consequently, it is possible to reduce the impact on the passenger. Moreover, the first sub bag 221L deploys in front of the passenger P on one side, and therefore can absorb the impact of not only a frontal collision but also a left side collision and an oblique collision. Consequently, it is possible to improve the function to protect the passenger P in various types of collisions.

Here, the second sub bag 221R can absorb the impact in the same way as the first sub bag 221L, in particular, can absorb the impact of a right side collision and an oblique collision, and therefore it is also possible to improve the function to protect the passenger P in various types of collisions.

<Passenger Protection Apparatus with Sub Bags in Different Sizes>

Figure 2A:
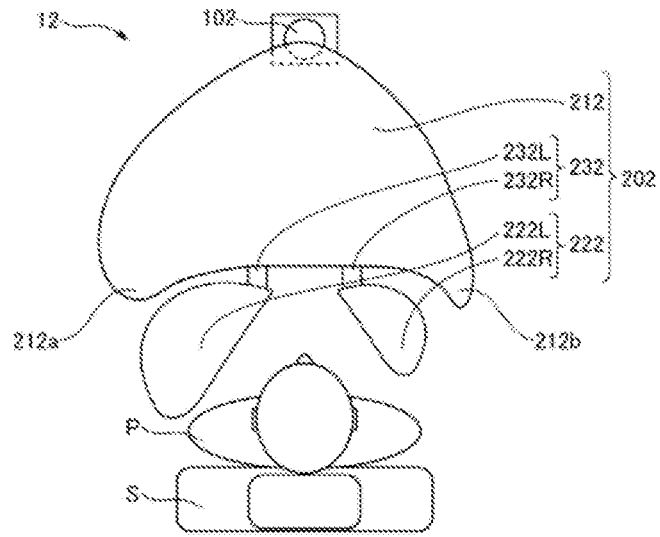
FIGS. 2A-2B are plan views schematically illustrating the passenger protection apparatus according to another example of the present invention.
Figure 2B:
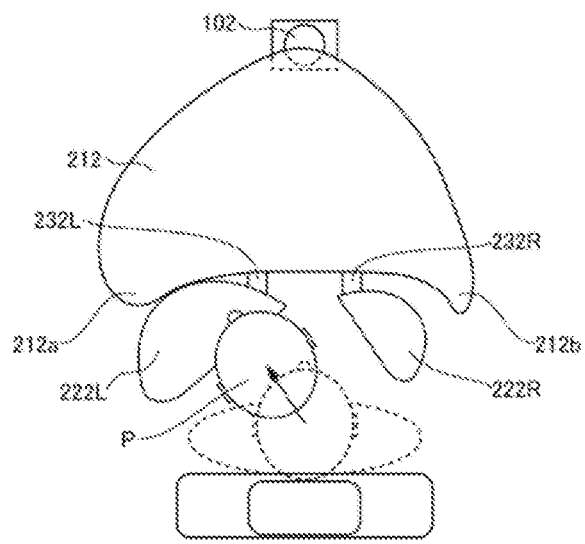

Next, another example of the passenger protection apparatus will be described. With the present example, a passenger protection apparatus 12 includes the sub bags in different sizes. FIGS. 2A and 2B are plan views schematically illustrating the passenger protection apparatus 12 according to the present example.

<Configuration of Passenger Protection Apparatus 12>

As illustrated in FIGS. 2A and 2B, the passenger protection apparatus 12 according to the present example includes an inflator 102 and an airbag 202 in the same way as the passenger protection apparatus 11 according to the above-described example.

<Inflator 102>

The inflator 102 injects the gas into the airbag 202, based on a signal received from the abnormality detector in the same way as the inflator 101 according to the above-described example.

<Airbag 202>

The airbag 202 has a pouch-shaped body into which the gas is injected by the inflator 102. When the airbag 202 is not actuated, it is compactly folded. When the airbag 202 is supplied with the gas by the inflator 102, the airbag 202 can expand toward the passenger P to deploy around the passenger P.

Moreover, the airbag 202 includes a main bag 212, sub bags 222, and connectors 232.

<Main Bag 212>

The main bag 212 has a pouch-shaped body and is configured to support the head and the upper body of the passenger P in occurrence of an abnormality such as a collision. The main bag 212 includes a first protrusion 212a and a second protrusion 212b configured to protrude from the main bag 212 beyond the sides of the passenger P when the main bag 212 deploys. Here, the first protrusion 212a is formed near the center of the vehicle, and the second protrusion 212b is formed to face the outside of the vehicle, that is, on the door side.

<Sub Bag 222>

The sub bags 222 are coupled to the main bag 212 via the connectors 232, and configured to protrude to the passenger P to deploy between the passenger P and the main bag 212. The sub bags 222 include a first sub bag 222L and a second sub bag 222R. With respect to the center of the passenger P, the first sub bag 222L deploys near the center of the vehicle, and the second sub bag 222R deploys near the outside (to face the outside) of the vehicle, that is, deploys on the door side of the vehicle. That is, the first sub bag 222L and the second sub bag 222R may be referred to as "center sub bag", and "outside sub bag", respectively.

The first sub bag 222L is greater than the second sub bag 222R when they deploy. In addition, when the first sub bag 222L deploys, the first protrusion 212a of the main bag 212 restricts the first sub bag 222L from moving diagonally forward left, that is, to the center of the vehicle. Likewise, when the second sub bag 222R deploys, the second protrusion 212b of the main bag 212 restricts the second sub bag 222R from moving diagonally forward right, that is, to the right door of the vehicle.

<Connector 232>

The connectors 232 are configured to couple the sub bags 222 to the main bag 212. When a force is applied to the sub bags 222 in the vehicle width direction, the sub bags 222 can swing while being coupled to the main bag 212 via the connector 232. That is, although the connectors 232 couple the main bag 212 to the sub bags 222, the shape of the connectors 232 is not fixed. To be more specific, when a force is applied to the sub bags 222, the connectors 232 can be freely deformed while maintaining the coupling of the main bag 212 and the sub bags 222, and consequently increase the freedom of the motion of the sub bags 222. In addition, a flow path that allows the gas in the main bag 212 to flow into the sub bag 222 is formed in each of the connectors 232.

The connectors 232 include a first connector 232L and a second connector 232R. The first connector 232L is configured to swingably couple the first sub bag 222L to the main bag 212. Here, the first connector 232L coupling the first sub bag 222L is located between the center of the passenger P and the first protrusion 212a in the vehicle width direction. The second connector 232R is configured to swingably couple the second sub bag 222R to the main bag 212. Here, the second connector 232R coupling the second sub bag 222R is located between the center of the passenger P and the second protrusion 212b in the vehicle width direction. In this way, the first connector 232L couples the first sub bag 222L to increase the freedom of the motion of the first sub bag 222L. Therefore, when a force is applied from the first sub bag 222L to the main bag 212, the first sub bag 222L closely contacts the main bag 212, so that both the first sub bag 222L and the main bag 212 absorb the impact. Consequently, it is possible to improve the function to protect the passenger P, in the same way as the above-described example. Likewise, the second connector 232R couples the second sub bag 222R to increase the freedom of the motion of the second sub bag 222R. Therefore, when a force is applied from the second sub bag 222R to the main bag 212, the second sub bag 222R closely contacts the main bag 212, so that both the second sub bag 222R and the main bag 212 absorb the impact. Consequently, it is possible to improve the function to protect the passenger P. Moreover, the main bag 212 includes the first protrusion 212a and the second protrusion 212b to surely catch the first sub bag 222L and the second sub bag 222R, respectively. Therefore, it is possible to improve the function to protect the passenger P.

Moreover, the main bag 212 has the vent holes formed at the positions to which the first connector 232L and the second connector 232R are coupled. The first sub bag 222L and the second sub bag 222R have inlets to supply the gas to the sub bags 222 at the positions to which the first connector 232L and the second connector 232R are coupled, respectively. The first connector 232L couples the vent hole of the main bag 212 to the inlet of the first sub bag 222L to allow the gas injected into the main bag 212 to be outputted to the first sub bag 222L. Likewise, the second connector 232R couples the vent hole of the main bag 212 to the inlet of the second sub bag 222R to allow the gas injected into the main bag 212 to be outputted to the second sub bag 222R.

Figure 3:
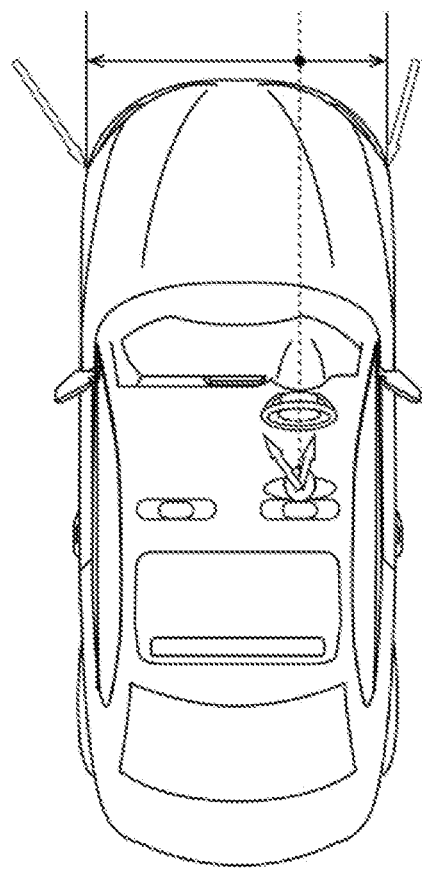
FIG. 3 is a schematic view illustrating a force applied to a passenger in a collision of a vehicle.

Here, the moving distance of the passenger P in an oblique collision at the front of the vehicle will be described. FIG. 3 is a schematic view illustrating the moving distance of the passenger P in a collision of the vehicle.

As illustrated in FIG. 3, when an oblique collision occurs at the front right of the vehicle, that is, in front of the driver's seat, the force of the impact is applied to the passenger P sitting on the driver's seat, and then the passenger P moves to the front right. Meanwhile, when an oblique collision occurs at the front left of the vehicle, that is, in front of the front passenger seat, the force of the impact is applied to the passenger P sitting on the front passenger seat, and then the passenger P moves to the front left. In general, the moving distance of the passenger P sitting on the front passenger seat in a collision is longer than that of the passenger P sitting on the driver's seat in a collision.

With the present example, the first sub bag 222L is greater than the second sub bag 222R, and therefore the sub bag 222 can absorb a greater impact of the collision at the front left of the vehicle than when the collision occurs at the front right of the vehicle. Moreover, the second sub bag 222R is smaller than the first sub bag 222L, and therefore it is possible to reduce the volume of the inflator 102.

<Passenger Protection Apparatus Including Sub Bags with Dedicated Flow Passage>

Figure 4:
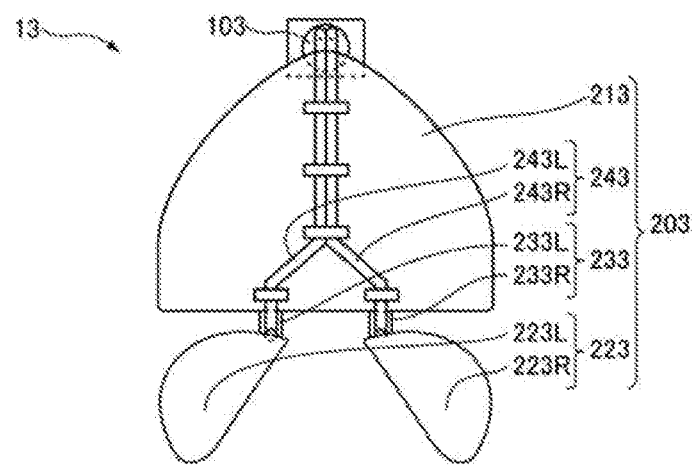
FIG. 4 is a plan view schematically illustrating the passenger protection apparatus according to another example of the present invention.

Next, another example of the passenger protection apparatus will be described. A passenger protection apparatus 13 includes sub bags provided with dedicated flow passages. FIG. 4 is a plan view schematically illustrating the passenger protection apparatus 13 according to the present example.

<Configuration of Passenger Protection Apparatus 13>

As illustrated in FIG. 4, the passenger protection apparatus 13 according to the present example includes an inflator 103 and an airbag 203 in the same way as the passenger protection apparatus 11, 12 according to the above-described examples.

<Inflator 103>

The inflator 103 injects the gas into the airbag 203, based on a signal received from the abnormality detector, in the same way as the inflator 101, 102 according to the above-described examples. In addition, the inflator 103 is configured to inject gas individually into a main bag 213 and sub bags 223 described later. The gas is injected into the sub bags 223 via flow passages 243 described later.

<Airbag 203>

The airbag 203 has a pouch-shaped body into which the gas is injected by the inflator 103. When the airbag 203 is not actuated, it is compactly folded. When the airbag 203 is supplied with the gas by the inflator 103, the airbag 203 can expand toward the passenger P to deploy around the passenger P.

Moreover, the airbag 203 includes a main bag 213, sub bags 223, connectors 233, and the flow passages 243.

<Main Bag 213>

The main bag 213 has a pouch-shaped body and is configured to support the head and the upper body of the passenger P in occurrence of an abnormality such as a collision.

<Sub Bag 223>

The sub bags 223 are coupled to the main bag 213 via the connectors 233, and configured to protrude to the passenger P to deploy between the passenger P and the main bag 213. The sub bags 223 include a first sub bag 223L and a second sub bag 223R. With respect to the center of the passenger P, the first sub bag 223L deploys near the center of the vehicle, and the second sub bag 223R deploys to face the outside of the vehicle, that is, deploys on the door side of the vehicle.

<Connector 233>

The connectors 233 are configured to couple the sub bags 223 to the main bag 213. When a force is applied to the sub bags 223 in the vehicle width direction, the sub bags 223 can swing while being coupled to the main bag 213 via the connectors 233. That is, although the connectors 233 couple the main bag 213 to the sub bags 223, the shape of the connectors 233 is not fixed. To be more specific, when a force is applied to the sub bags 223, the connectors 233 can be freely deformed while maintaining the coupling of the main bag 213 and the sub bags 223, and consequently increase the freedom of the motion of the sub bags 223.

The connectors 233 include a first connector 233L and a second connector 233R. The first connector 233L is configured to swingably couple the first sub bag 223L to the main bag 213. The second connector 233R is configured to swingably couple the second sub bag 223R to the main bag 213.

<Flow Passages 243>

The flow passages 243 are configured to couple the inflator 103 to the sub bags 223 to supply the gas from the inflator 103 to the sub bags 223. The flow passages 243 include a first flow passage 243L and a second flow passage 243R.

The first flow passage 243L couples the inflator 103 to the first sub bag 223L to supply the gas from the inflator 103 to the first sub bag 223L. The second flow passage 243R couples the inflator 103 to the second sub bag 223R to supply the gas from the inflator 103 to the second sub bag 223R.

As described above, the sub bags 223 are swingably coupled to the main bag 213 via the connectors 233, and therefore can move to absorb the impact, and more effectively absorb the impact than when the sub bags 223 are fixedly coupled to the main bag 213. Consequently, it is possible to reduce the impact on the passenger. Moreover, it is possible to absorb the impact of various types of collisions, such as a lateral collision and an oblique collision, and therefore to improve the function to protect the passenger P in various types of collisions.

Moreover, the gas is supplied from the inflator 103 to the sub bags 223 independently of the connectors 233. Therefore, when the encompassing connectors 233 are deformed in any way, it is possible to surely supply the gas to the sub bags 223 to deploy the sub bags 223, and consequently to improve the function to protect the passenger P.

Here, with the present example, the gas is supplied to the main bag 213 and the sub bags 223 by the single inflator 103. However, this is by no means limiting, and inflators may be provided individually for the main bag 213 and the sub bags 223. Moreover, inflators may be provided individually for the first sub bag 223L and the second sub bag 223R of the sub bags 223.

As described above, the passenger protection apparatus includes the main bag, and the sub bags configured to deploy in front of the passenger P on the sides of the passenger. The sub bags are swingably coupled to the main bag via the connectors. By this means, the sub bags can move to absorb the impact when the passenger contacts the sub bags. Therefore, it is possible to reduce the impact on the passenger when the airbag deploys, and consequently improve the passenger protection function in various types of collisions. In addition, the sub bags swing and closely contact the main bag, so that the sub bags are held by the main bag. Therefore, it is possible to absorb the impact of the collision by both the sub bags and the main bag, and consequently to improve the passenger protection function.

Moreover, with the above-described examples, the passenger protection apparatus includes the sub bags having an approximate half-moon shape with a flat surface facing the passenger. Both front ends of the sub bags extend to cover the maximum range of the lateral movement of the passenger. Therefore, it is possible to surely catch the passenger by the sub bags in a collision, and consequently to improve the passenger protection function.

Moreover, with the above-described examples, the main bag includes the first protrusion and the second protrusion located outside the connectors 232. Therefore, it is possible to appropriately restrict the movement of the sub bags, and consequently to reduce the impact on the passenger when the airbag deploys. As a result, it is possible to improve the passenger protection function in various types of collisions.

Furthermore, with the above-described examples, the sub bags of the passenger protection apparatus include the first sub bag configured to deploy near the center of the vehicle, and the second sub bag configured to deploy on the door side. The first sub bag is greater than the second sub bag. Therefore, it is possible to effectively absorb the impact on the passenger near the center of the vehicle, which is relatively high. In addition, the second sub bag 222R is compact, and therefore it is possible to reduce the volume of the inflator 102.

Furthermore, with the above-described examples, the passenger protection apparatus includes the connectors with the flow paths configured to flow the gas in the main bag into the sub bags. Therefore, it is possible to easily supply the gas generated by the inflator to the sub bags. In addition, it is possible to deploy the main bag before the sub bags deploy.

Furthermore, in the passenger protection apparatus according to the above-described example, the gas is supplied individually to the main bag and the sub bags. Therefore, it is possible to surely deploy the main bag and the sub bags. In addition, the gas can be supplied to the sub bags independently of the connectors, and therefore it is possible to surely supply the gas to the sub bags to deploy the sub bags even though a large force is applied to the connectors to deform the encompassing connectors. Consequently, it is possible to improve the passenger protection function.

The invention claimed is:

1. A passenger protection apparatus comprising:
an airbag configured to hold a passenger sitting on a seat of a vehicle when the airbag deploys; and
an inflator configured to supply gas to expand the airbag, the airbag comprising:
a main bag configured to hold a head and an upper body of the passenger;
sub bags configured to protrude to the passenger to deploy between the main bag and the passenger; and
connectors configured to swingably couple the sub bags to the main bag at positions out of a center of the seat in a vehicle width direction, so that the sub bags can swing when a force is applied to the sub bags in the vehicle width direction, and
wherein
the connectors each define or encompass a flow path of a predetermined, elongated length, with each flow path extending from a respective vent hole of the main bag to a respective sub bag inlet, and with each flow path including a first opening end fixed on a respective one of the vent holes and a second opening end that is spaced from the first opening end and fixed on a respective one of the sub bag inlets.

2. The passenger protection apparatus according to claim 1, wherein protrusions configured to protrude to the sub bags are formed in the main bag, the protrusions being located outside the connectors.

3. The passenger protection apparatus according to claim 2, wherein the sub bags include:
a center sub bag disposed on a side facing the center of the vehicle with respect to the center of the seat in the vehicle width direction; and
an outside sub bag disposed on a side facing an outside of the vehicle with respect to the center of the seat in the vehicle width direction, the center sub bag being greater in size than the outside sub bag.

4. The passenger protection apparatus according to claim 2, wherein the flow paths are defined by elongated interior walls of the connectors which allow the gas to flow from the main bag into the sub bags.

5. The passenger protection apparatus according to claim 2, wherein the inflator supplies gas individually to the main bag and the sub bags.

6. The passenger protection apparatus according to claim 1, wherein the flow paths are defined by elongated interior walls of the connectors which allow the gas to flow from the main bag into the sub bags.

7. The passenger protection apparatus according to claim 1, wherein the inflator supplies gas individually to the main bag and the sub bags.

8. The passenger protection apparatus according to claim 1, wherein the connectors extend away from a respective receiving region of the main bag and into a respective connection region of the sub bags such that the supply gas passes out of the main bag, through an elongated interior of the connectors while passing within a respective one of the flow paths, and into the sub bags.

9. The passenger protection apparatus according to claim 8, wherein the connectors are configured as to define the flow paths with an interior surface of the connectors.

10. The passenger protection apparatus according to claim 8 further comprising dedicated flow passageways in supply gas communication with the inflator, and said dedicated flow passageways each comprise a section defining a respective one of the flow paths, with each section being encompassed by an interior surface of a respective one of the connectors.

11. The passenger protection apparatus according to claim 1 wherein the connectors extend away from the main body as to separate, upon inflation, the main bag from the sub bags and as to form gap regions in which the swingably coupled sub bags swing in position relative to the main bag upon deflection.

12. A passenger protection apparatus comprising:
an airbag configured to hold a passenger sitting on a seat of a vehicle when the airbag deploys; and
an inflator configured to supply gas to expand the airbag, the airbag comprising:
a main bag configured to hold a head and an upper body of the passenger;
sub bags configured to protrude to the passenger to deploy between the main bag and the passenger; and
connectors configured to swingably couple the sub bags to the main bag at positions out of a center of the seat in a vehicle width direction, so that the sub bags can swing when a force is applied to the sub bags in the vehicle width direction,
and wherein:
each of the sub bags has an approximate half-moon shape with a flat surface facing the passenger; and
front ends of side portions of the sub bags extend to cover a maximum range of a lateral movement of the passenger.

13. The passenger protection apparatus according to claim 12, wherein protrusions configured to protrude to the sub bags are formed in the main bag, the protrusions being located outside the connectors.

14. The passenger protection apparatus according to claim 13, wherein the sub bags include:
   a center sub bag disposed on a side facing the center of the vehicle with respect to the center of the seat in the vehicle width direction; and
   an outside sub bag disposed on a side facing an outside of the vehicle with respect to the center of the seat in the vehicle width direction, the center sub bag being greater in size than the outside sub bag.

15. The passenger protection apparatus according to claim 12, wherein the sub bags include:
   a center sub bag disposed on a side facing the center of the vehicle with respect to the center of the seat in the vehicle width direction; and
   an outside sub bag disposed on a side facing an outside of the vehicle with respect to the center of the seat in the vehicle width direction, the center sub bag being greater in size than the outside sub bag.

16. The passenger protection apparatus according to claim 12, wherein flow paths are defined by elongated interior walls of the connectors which allow the gas to flow from the main bag into the sub bags.

17. The passenger protection apparatus according to claim 12, wherein the inflator supplies gas individually to the main bag and the sub bags.

18. The passenger protection apparatus according to claim 13, wherein flow paths are defined by elongated interior walls of the connectors which allow the gas to flow from the main bag into the sub bags.

19. The passenger protection apparatus according to claim 13, wherein the inflator supplies gas individually to the main bag and the sub bags.

20. A passenger protection apparatus comprising:
   an airbag configured to hold a passenger sitting on a seat of a vehicle when the airbag deploys; and
   an inflator configured to supply gas to expand the airbag, the airbag comprising:
      a main bag configured to hold a head and an upper body of the passenger;
      sub bags configured to protrude to the passenger to deploy between the main bag and the passenger; and
      connectors configured to swingably couple the sub bags to the main bag at positions out of a center of the seat in a vehicle width direction, so that the sub bags can swing when a force is applied to the sub bags in the vehicle width direction,
   and wherein the sub bags include:
   a center sub bag disposed on a side facing the center of the vehicle with respect to the center of the seat in the vehicle width direction; and
      an outside sub bag disposed on a side facing an outside of the vehicle with respect to the center of the seat in the vehicle width direction, the center sub bag being greater in size than the outside sub bag.

* * * * *